United States Patent
Marvin et al.

(10) Patent No.: US 11,423,798 B1
(45) Date of Patent: Aug. 23, 2022

(54) USER INTERFACES THAT MOTIVATE ENGAGEMENT BY INMATES OF CONFINEMENT INSTITUTIONS IN SELF-ADMINISTERED COURSES

(71) Applicant: Confinement Telephony Technology, LLC, Greensboro, NC (US)

(72) Inventors: Mary Henson Marvin, Hickory, NC (US); John Vincent Townsend, Kennersville, NC (US); Rick Allen Lubbehusen, Winston-Salem, NC (US); Johnnie Richard Tayloe, Rural Hall, NC (US); Thomas Edward Dearden, High Point, NC (US)

(73) Assignee: Confinement Telephony Technology, LLC, Greensboro, NC (US)

( * ) Notice: Subject to any disclaimer, the term of this patent is extended or adjusted under 35 U.S.C. 154(b) by 605 days.

(21) Appl. No.: 15/928,532

(22) Filed: Mar. 22, 2018

Related U.S. Application Data (60) Provisional application No. 62/570,913, filed on Oct. 11, 2017.

(51) Int. Cl.
  *G09B 7/07* (2006.01)
  *G06F 3/04817* (2022.01)
      (Continued)

(52) U.S. Cl.
  CPC ............. *G09B 7/07* (2013.01); *G06F 3/0482* (2013.01); *G06F 3/04817* (2013.01);
      (Continued)

(58) Field of Classification Search
  None
  See application file for complete search history.

(56) References Cited

U.S. PATENT DOCUMENTS

| 2004/0248070 | A1* | 12/2004 | Ancier | G06Q 30/02 434/238 |
| 2005/0171816 | A1* | 8/2005 | Meinert | G16H 70/40 705/3 |

(Continued)

OTHER PUBLICATIONS

Adcock, R. A., Thangavel, A., Whitfield-Gabrieli, S., Knutson, B., & Gabrieli, J. D. "Reward-motivated learning: Mesolimbic activation precedes memory formation". Neuron, 50(3), 507-517, May 4, 2006.

(Continued)

*Primary Examiner* — Nathan Hillery
(74) *Attorney, Agent, or Firm* — Thompson Hine LLP (57) ABSTRACT

Implementations disclosed herein provide user interfaces that are configured to selectively use and present device and system resources in ways that motivate inmate engagement with self-administered courses. One example of this is a user interface that is provided with music enabling capabilities as a reward to motivate course engagement. The user interface presents a segment of course material of one or more self-administered courses and the app determines an engagement score indicating a level of engagement by the inmate with the segment of the course material. The app determines that the inmate qualifies for a music reward based on the engagement score satisfying reward criteria, and accordingly displays, on the user interface, a notification of the music reward and/or enables music on the inmate device, for example, during display of a second segment of the course material.

12 Claims, 7 Drawing Sheets

(51) Int. Cl.
  *G09B 5/06* (2006.01)
  *G06F 3/16* (2006.01)
  *H04L 51/10* (2022.01)
  *G06F 3/0482* (2013.01)

(52) U.S. Cl.
  CPC ............. *G06F 3/165* (2013.01); *G09B 5/065* (2013.01); *H04L 51/10* (2013.01)

(56) References Cited

U.S. PATENT DOCUMENTS

| | | | | |
|---|---|---|---|---|
| 2009/0076832 | A1* | 3/2009 | Collins | G06Q 50/26 705/1.1 |
| 2011/0317820 | A1* | 12/2011 | Torgersrud | H04M 3/38 379/88.09 |
| 2012/0276513 | A1* | 11/2012 | Ayers | G09B 19/00 434/310 |
| 2013/0263227 | A1* | 10/2013 | Gongaware | H04L 63/08 726/4 |
| 2013/0331061 | A1* | 12/2013 | Byrne | H04M 3/38 455/410 |
| 2014/0279767 | A1* | 9/2014 | Torgersrud | G06N 5/02 706/14 |
| 2014/0297395 | A1* | 10/2014 | Chao | G06Q 30/0201 705/14.41 |
| 2016/0006865 | A1* | 1/2016 | Edwards | H04M 3/2281 379/114.22 |
| 2016/0098753 | A1* | 4/2016 | Login | G06Q 30/0251 705/14.55 |
| 2016/0315836 | A1* | 10/2016 | Hill | H04L 63/10 |
| 2017/0249657 | A1* | 8/2017 | Heidi | G06Q 30/0255 |
| 2017/0324834 | A1* | 11/2017 | Hodge | H04L 12/287 |
| 2017/0331960 | A1* | 11/2017 | Hodge | H04M 15/8033 |
| 2017/0353404 | A1* | 12/2017 | Hodge | H04L 67/02 |
| 2018/0174259 | A1* | 6/2018 | Hodge | G06F 16/285 |
| 2018/0218730 | A1* | 8/2018 | Volkart | H04M 3/387 |
| 2018/0278462 | A1* | 9/2018 | Bjontegard | A63F 13/79 |
| 2018/0338036 | A1* | 11/2018 | Hodge | H04M 3/2281 |
| 2019/0007559 | A1* | 1/2019 | Hodge | H04M 15/882 |
| 2019/0104938 | A1* | 4/2019 | Utley | A61B 5/7275 |

OTHER PUBLICATIONS

Bottiroli, S., Rosi, A., Russo, R., Vecchi, T., & Cavallini, E. "The cognitive effects of listening to background music on older adults: processing speed improves with upbeat music, while memory seems to benefit from both upbeat and downbeat music." Frontiers in Aging Neuroscience, Oct. 2014, vol. 6.

Buckley, P., & Doyle, E. (2016) "Gamification and student motivation". Interactive Learning Environments, vol. 24, No. 6, 1162-1175.

Cameron, J., Pierce, W. D., Banko, K. M., & Gear, A. "Achievement-based rewards and intrinsic motivation: A test of cognitive mediators." Journal of Educational Psychology, vol. 97, No. 4, 641-655. Jun. 2005.

Deci, E. L., (1971) "Effects of externally mediated rewards on intrinsic motivation." Journal of Personality and Social Psychology, vol. 18, No. 1, 105-115.

Garaus, C., Furimuller, G., & Guttel, W. H. (2016), "The hidden power of small rewards: External Rewards in online Learning." Academy of Management Learning & Education, 1-15.

Hewett, R., & Conway, N. (2016). "The undermining effect revisited: The salience of everyday verbal rewards and self-determined motivation." Journal of Organizational Behavior, vol. 37, No. 3, 436-455.

Hidi, S. ,"Revisiting the role of rewards in motivation and learning: implications of neuroscientific research." Educational Psychology Review, vol. 28, No. 1, 61-93, published online: Apr. 22, 2015.

Iyengar, S. S., & Lepper, M. R. (2000). When choice is demotivating: Can one desire too much of a good thing? Journal of Personality and Social Psychology, vol. 79, No. 6, 995-1006.

Khalid, S., & Ayub, R., "impact of Rewards on Employees' Motivation: A Study of a Pakistani Firm." RADS Journal of Social Sciencess & Business Management, vol. 3, No. 1, 45-54. Jan. 2015.

Kringeibach, M. L, & Berridge, K. C. (2016). "Neuroscience of Reward, Motivation, and Drive"; Recent Developments in Neuroscience Research on Human Motivation, vol. 19, (pp. 23-35): Emerald Group Publishing Limited.

Manohar, S. G., Finzi, R. D., Drew, D., & Husain, M., "Distinct Motivational Effects of Contingent and Noncontingent Rewards." Psychological Science, vol. 28(7), 1016-1026. Jan. 19, 2017.

Moreno, R., & Mayer, R. E. (2000), "A coherence effect in multimedia learning: The case for minimizing irrelevant sounds in the design of multimedia instructional messages." Journal of Educational Psychology 2000, vol. 92, No. 1, pp. 117-125.

Schultz, W. (2007), "Reward." Scholarpedia, 2(3): 1652 Retrieved from http://www.schoiarpedia.org/articie/Reward, pp. 1-8.

Waelti, P., Dickinson, A., & Schultz, W. (2001). "Dopamine responses comply with basic assumptions of formal learning theory". Nature 412; pp. 43-48.

\* cited by examiner

USER INTERFACES THAT MOTIVATE ENGAGEMENT BY INMATES OF CONFINEMENT INSTITUTIONS IN SELF-ADMINISTERED COURSES

RELATED APPLICATIONS

This patent application claims the benefit of U.S. Provisional Application No. 62/570,913 filed on Oct. 11, 2017, entitled "Motivating Engagement in Self-Administered Courses by Inmates of Confinement Institutions," which is incorporated herein by this reference in its entirety.

FIELD OF THE INVENTION

This disclosure relates generally to devices and systems associated with inmate communications, information, and services.

BACKGROUND

Confinement institution inmates have traditionally had very limited access to telephones and electronic devices. Recently, confinement institutions have begun allowing inmates to use tablets, desktops, laptops, and other computing devices, and allowing inmates to access resources that are available via electronic networks such as the Internet. Inmates use these devices and systems to access and participate in educational and other courses. Video recordings, live presentations, audio content, tests, evaluations, and other such content is downloaded on these devices from servers and/or provided via online sources to these devices. While the course-providing systems enable inmates to participate in courses, the systems generally do not adequately track participation or motivate inmates to engage in the courses to learn the course materials. As a result, inmates often do not obtain the desired skills and experience that are intended for course participants.

SUMMARY

Implementations of the invention disclosed herein provide user interfaces that are configured to selectively enable device and system resources in ways that motivate inmate engagement with self-administered courses. Inmates who demonstrate sufficient engagement are rewarded with various rewards. One example of this is a user interface that is provided with music enabling capabilities as a reward to motivate course engagement. One method implementing such a technique involves displaying a user interface of an app on an inmate device. The user interface presents a segment of course material of one or more self-administered courses. The method determines, via the app, an engagement score indicating a level of engagement by the inmate with the segment of the course material during the display of the segment of the course material. The method determines, via the app, that the inmate qualifies for a music reward based on the engagement score satisfying reward criteria. The method displays, on the user interface, a second segment of the course material of the one or more self-administered. Based on determining that the inmate qualifies for the music reward based on the engagement score satisfying the reward criteria, the method displays, on the user interface, a notification of the music reward and/or enables music on the inmate device during display of the second segment of the course material.

In another implementation, a user interface is configured to selectively use and present messaging capabilities as rewards to motivate course engagement. One method implementing such a technique involves displaying a user interface of an app on an inmate device. The user interface presents a segment of course material of one or more self-administered courses. The method determines, via the app, an engagement score indicating a level of engagement by the inmate with the segment of the course material during the display of the segment of the course material. The method determines, via the app, that the inmate qualifies for a reward based on the engagement score satisfying reward criteria. Based on determining that the inmate qualifies for the reward based on the engagement score satisfying the reward criteria, the method determines to enable a messaging feature via the user interface and/or displays, on the user interface, a notification of the messaging reward. The method provides one or more messages via the enabled messaging feature.

In another implementation, a user interface is configured to selectively use and present capabilities that are specific to inmates (e.g., based on an assessment of the inmate or the inmate's interests) as rewards to motivate course engagement. One method implementing such a technique involves identifying self-administered courses available to the inmate and storing a dataset of information about the self-administered courses, such as course categories of the self-administered courses. The method receives an assessment completed with information about the inmate and identifies one or more interest categories for the inmate based on the assessment. The method creates a plan for the inmate to complete a set of the self-administered courses based on the course categories and the one or more interest categories identified for the inmate. The method displays a user interface of an app on an inmate device that presents a segment of course material of one or more self-administered courses. The method determines an engagement score indicating a level of engagement by the inmate with the segment of the course material during the display of the segment of the course material. The method determines that the inmate qualifies for a reward based on the engagement score satisfying reward criteria and determines a type of the reward based on the interest categories identified for the inmate. The method displays on the user interface, a notification of the reward, the notification identifying the type of the reward, and provides the reward to the inmate.

The details of one or more implementations of the invention are set forth in the accompanying drawings and the description below. Other features, objects, and advantages of the invention will be apparent from the description and drawings, and from the claims.

BRIEF DESCRIPTION OF THE FIGURES

These and other features, implementations, and advantages of the present disclosure are better understood when the following Detailed Description is read with reference to the accompanying drawings.

DETAILED DESCRIPTION

As described above, existing systems that provide courses to inmates do not adequately motivate inmates to engage in the courses to learn the course materials. The systems fail to adequately supervise the participation in the courses. As a result, inmates are frequently able to obtain credit for completing a course without paying attention to or even being present for the entire course. The systems generally fail to adequately reward inmates for engaging with course content.

Implementations of the invention provide an improved electronic course system and associated user interfaces that are specifically configured to motivate engagement by inmates in online courses. In some implementation, the system identifies an inmate, monitors the inmate during and after the course, provides credits to an inmate based on the inmate's engagement during the course, and provides user interfaces with features that are configured specifically to motivate inmate course engagement. The term "credits" as used herein, refers to any quantification of engagement, i.e., effort, success, or value and includes, but is not limited to, points, cash, tokens, and/or any other indicator in electronic or paper form representing effort, success, or value. The inmate's engagement is tracked and an engagement score is awarded based on the level of engagement. The higher the engagement score, the more credits are awarded to the inmate.

Credits can be earned using one or more techniques depending upon the particular implementation and circumstances. In one implementation of the invention, the inmate is required to identify himself/herself and/or to answer questions both periodically during the course and following the course (e.g., immediately after, a day after, a week after, etc.). These questions are used to determine an engagement score, which ultimately can be used to motivate the inmate's engagement as the inmate participates in one or more courses as described herein.

The frequency of the rewarding of and/or use of credits can be configured to motivate the inmates. For example, infrequent rewards may provide more motivation for particular types of inmates and/or circumstances than more frequent rewards. The frequency of the reward can depend, for example, upon the amount of credits earned by an inmate such that the more credits are earned, the less frequently additional credits are awarded and/or the less frequently rewards can be obtained. In one implementation of the invention, credits can only be redeemed at set time periods (e.g., every Friday, the first day of every month, etc.). During the intervals between redemption days in this example, the inmates are encouraged to earn as many credits as possible for the upcoming (and relatively infrequent) redemption events. In another implementation of the invention, credits are awarded based on a combination of measuring effort by an inmate and a random factor that randomly adjusts the frequency and/or value of the awarding of and/or redeeming of credits. Such randomness can provide greater motivation to the inmate, making the experience more game like or otherwise more enjoyable.

In another implementation of the invention, the inmate is periodically instructed to type or say a particular phrase during a course (or provide some other specific input in an instruction that only an engaged participant would provide) and given a limited period of time to respond. Points are awarded based on the inmate successfully repeating such phrases or providing such requested input within the allotted time. In yet another implementation of the invention, the software applications and/or keystrokes of the device are monitored to detect lack of engagement. For example, if an inmate is typing in an email application while the online course is playing, points are deducted.

In another implementation of the invention, one or more sensors on the device can be used to track the inmate's eyes, head position, or other body position. In one implementation of the invention, a camera on a computing device captures an image of the user's head, face, or eyes. An orientation of the user's head, face, or eye is determined based on the image and compared with the direction/location of the device's screen and/or its content to determine whether the user is engaged with the experience. This can, but does not necessarily, involve determining a three dimensional model of the user's head, face, or eyes. An inmate can be awarded credits based on periodic checks that the inmate's head, face, or eyes are focused on the device's screen where the course content is being presented. In another example, credits are awarded simply based on detecting that the inmate's eyes are open. Still other implementations of the invention combine one or more of these and/or other techniques for tracking inmate engagement and award credits accordingly.

In one implementation of the invention, credits earned by the inmate provide results that are used to evaluate the inmate. For example, an inmate may be required to achieve at least a first threshold number of credits during a course to pass the course and at least a second threshold number of points to receive a particular grade (e.g., A, B, etc.), achieve a particular award (e.g., completed with honors), and/or reward (e.g., enabled music capabilities). Similarly, engagement scores and/or credits earned by the inmate can be the bases for providing a certificate of accomplishment to the inmate and others associated with the inmate. Providing such certificate to others can be a form of reward for engaging with the course as explained herein. Such information can be provided with or as part of the course results to better allow potential employers, counselors, facility administrators, family, and others to assess the inmate's engagement. An inmate may be motivated to be more engaged if he/she knows that prospective employers, family, counselors, or others will be aware of that engagement.

Credits earned by an inmate are used to engage the inmate in one or more alternative and additional ways. In some implementations, user interfaces of an app used by an inmate present course content to an inmate and also provide additional features that reward the inmate for engaging with the course content.

Example User Interface

Figure 1:
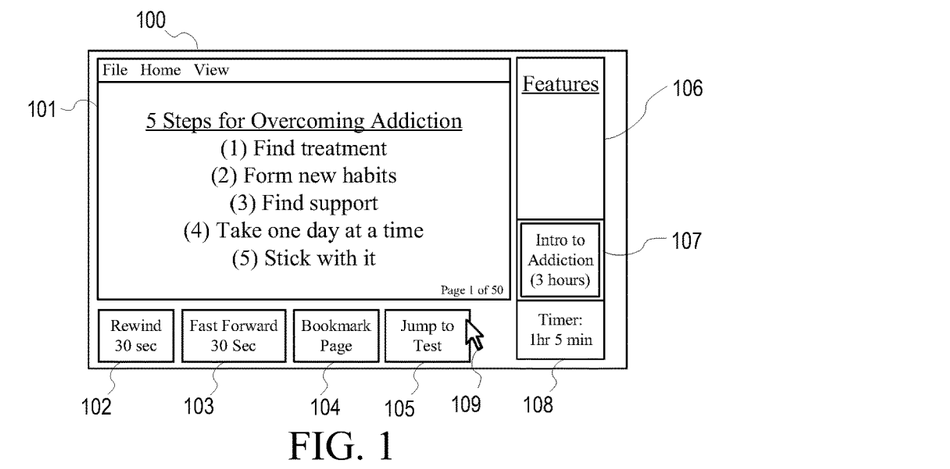
FIG. 1 is a block diagram illustrating an exemplary course content screen of a user interface in which features motivating course engagement are implemented.

FIGS. 1-6 are block diagrams illustrating exemplary user interface screens. FIG. 1 is a block diagram illustrating an exemplary course content screen 100 of a user interface of an app used by an inmate. The user interface screen 100 includes course content area 101 with exemplary content regarding a course entitled "Intro to Addiction" including a collection of content "5 Steps for Overcoming Addiction . . . " The user interface screen 100 further includes a rewind 30 seconds tool 102 and a fast forward 30 seconds tool 103 that enable the inmate to navigate within time-based course content. In other implementations of the invention, the content is not time-based (e.g., slides, etc.) and the user interface 100 instead presents tools for navigating within that content (e.g., a prior slide tool, a next slide tool, etc.). The user interface screen 100 further includes a bookmark page tool 104 that enables an inmate to bookmark a particular time point, slide, page, or other content for later review. Bookmarked content can be accessed directly by the inmate at a later point using one or more bookmark access features of the app. The user interface screen 100 further includes a jump to test tool 105 that enables an inmate to skip the remaining content in the current course and proceed directly to the course examination. The user interface screen 100 further includes a features section 106 that displays features that are enabled for the inmate, a title section 107 that identifies the current course title, and a timer section 108 that identifies the amount of time spent so far on the current course. Cursor 109 is controlled by the inmate to interact with the elements of the user interface screen 100. In alternative embodiments, the user interface responds to touch inputs on a touch screen of the device displaying the user interface or uses any other input modality.

Figure 2:
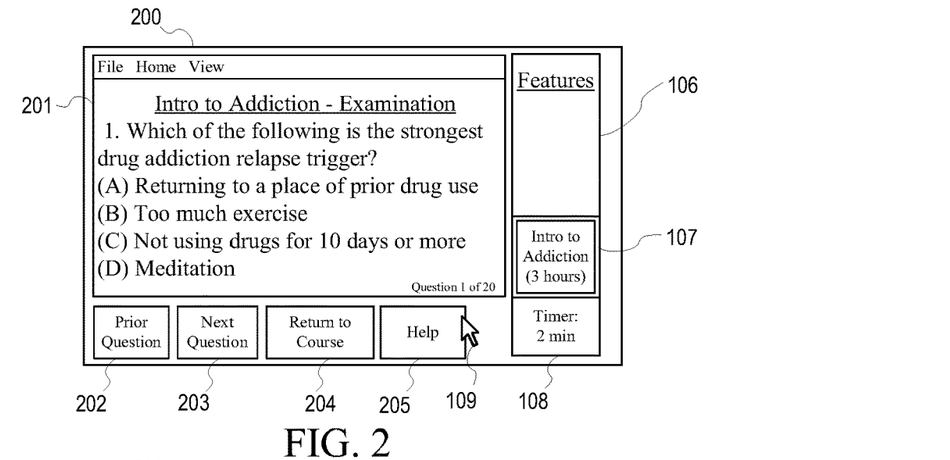
FIG. 2 is a block diagram illustrating an exemplary course examination screen of the user interface of FIG. 1.

FIG. 2 is a block diagram illustrating an exemplary course examination screen 200 of the user interface of FIG. 1. The user interface screen 200 includes course exam area 201 with an exemplary exam question regarding the course entitled "Intro to Addiction" including a question regarding "Which of the following is the strongest drug addiction relapse trigger?" and answer options. The user interface screen 200 further includes a prior question tool 202 and a next question tool 203 that enable the inmate to navigate within the questions of the examination. The user interface screen 200 further includes a return to course tool 204 that enables an inmate to discontinue the examination to return to the associated course. The user interface screen 200 further includes a help tool that enables an inmate to access help functions, e.g., contact an administrator, contact a technical specialist, search FAQs, etc. The user interface screen 200 further includes the features section 106 that displays features that are enabled for the inmate, the title section 107 that identifies the current course title, and the timer section 108, which in this case, identifies the amount of time spent so far on the current course examination. Cursor 109 is controlled by the inmate to interact with the elements of the user interface screen 200.

Figure 3:
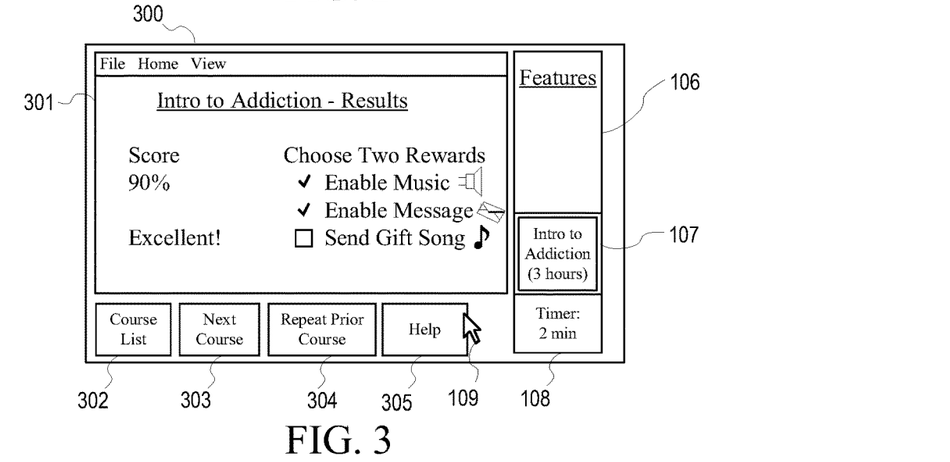
FIG. 3 is a block diagram illustrating an exemplary course results screen of the user interface of FIG. 1.

FIG. 3 is a block diagram illustrating an exemplary course results screen 300 of the user interface of FIG. 1. The user interface screen 300 includes course results area 301 with results regarding the course entitled "Intro to Addiction" including a score (e.g., "Score 90%"), a congratulatory message (e.g., "Excellent!"), and a user interface option for the inmate to select rewards based on results (e.g., "Choose Two Rewards" from the reward options "Enable Music," "Enable Message," and "Send Gift Song"). The user interface screen 300 further includes a course list tool 302 for accessing a list of available course that the inmate can view/attend. The user interface screen 300 also includes a next course tool 203 that enables the inmate to navigate to a next course in a sequence of courses or within a curriculum or plan. The user interface screen 300 further includes a repeat prior course tool 104 that enables an inmate to repeat the course that was just completed. The user interface screen 300 further includes a help tool 305 that enables an inmate to access help functions, e.g., contact an administrator, contact a technical specialist, search FAQs, etc. The user interface screen 300 further includes the features section 106 that displays features that are enabled for the inmate, the title section 107 that identifies the current course title, and the timer section 108, which in this case, identifies the amount of time spent on the course examination to which the results pertain. Cursor 109 is controlled by the inmate to interact with the elements of the user interface screen 300.

Figure 4:
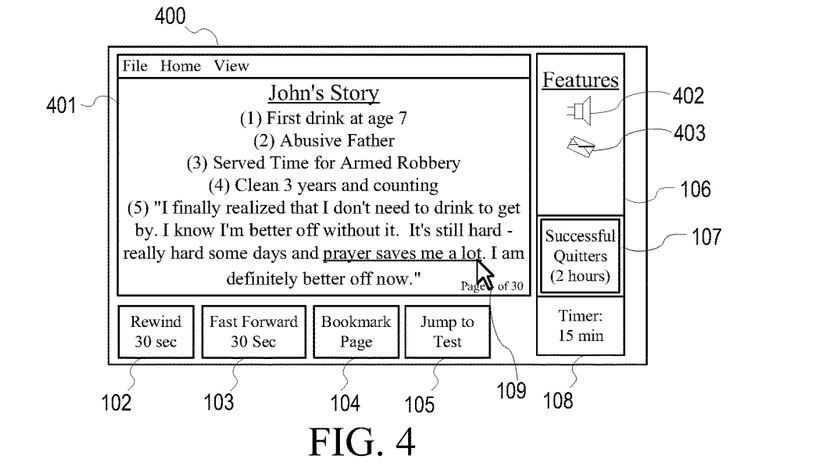
FIG. 4 is a block diagram illustrating an exemplary course content screen of the user interface of FIG. 1.

FIG. 4 is a block diagram illustrating an exemplary course content screen 400 of the user interface of FIG. 1. The user interface screen 400 includes course content area 401 with exemplary content regarding a course entitled "Successful Quiters" including a collection of content "John's Story . . . " The user interface screen 400 further includes the rewind 30 seconds tool 102, the fast forward 30 seconds tool 103, the bookmark page tool 104, and the jump to test tool 105 of the user interface screen 100 of FIG. 1. The user interface screen 400 further includes the features section 106 which, based on the earning and selection of a reward via the user interface screen of FIG. 3, now includes an icon for the music enabling feature 402 and an icon for the messaging feature 403. These features are enabled for the inmate to use within the app. The user interface screen 400 further includes the title section 107 that identifies the current course title and the timer section 108 that identifies the amount of time spent so far on the current course. Cursor 109 is controlled by the inmate to interact with the elements of the user interface 400. For example, the cursor 109 can be used to click on the icon for the music enabling feature 402.

Figure 5:
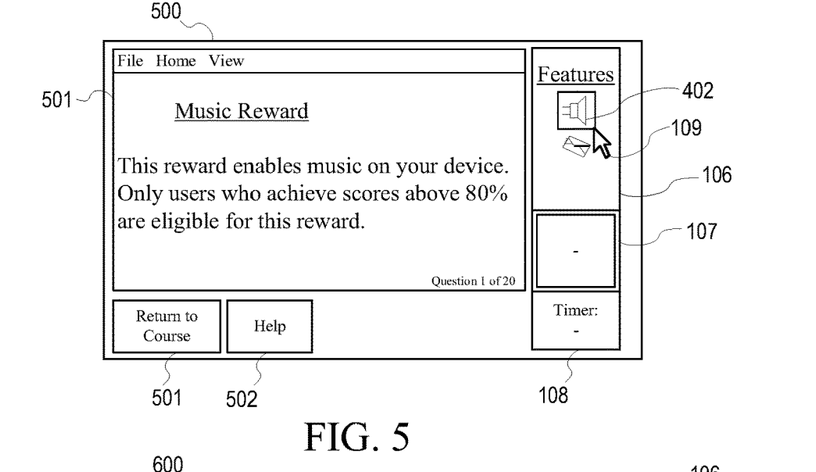
FIG. 5 is a block diagram illustrating an exemplary music reward screen of the user interface of FIG. 1.

FIG. 5 is a block diagram illustrating an exemplary music reward screen 500 of the user interface of FIG. 1. This user interface screen 500 is displayed in this example in response to a user selection of the icon for enabling music 402 via cursor 109. In this example, the user interface screen 500 includes a content area that describes the music enabling reward, e.g., "Music Reward This reward enables music on your device. Only users who achieve scores above 80% are eligible for this reward." Based on this feature, the app enables music to be played during the use of the app, during completion of a course, and/or on the inmate's device generally. The music reward may be limited in scope and/or duration depending upon the implementation of the invention and/or the nature of the reward. For example, a music enabling reward of a first type allows the inmate to listen to music during N number of subsequent courses, a music reward of a second type allows unlimited use of music during use of the app, a music reward of a third type may enable music on the device generally for a limited period of time, e.g., 1 hour, 1 day, 1 week, etc. The user interface screen 500 further includes a return to course option 501 for returning to the current course and a help option 502 for accessing help.

Figure 6:
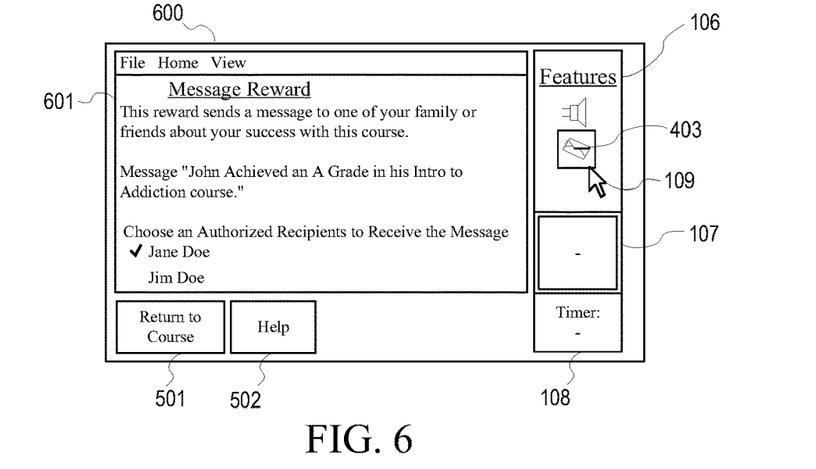
FIG. 6 is a block diagram illustrating an exemplary messaging reward screen of the user interface of FIG. 1.

FIG. 6 is a block diagram illustrating an exemplary messaging reward screen 600 of the user interface of FIG. 1. This user interface screen 600 is displayed in this example in response to a user selection of the icon for enabling messaging 403 via cursor 109. In this example, the user interface screen 600 includes a content area that describes the messaging reward, e.g., "Message Reward This reward sends a message to one of your family or friends about your success with this course," identifies the message, e.g., "Message: John Achieved an A Grade in his Intro to Addiction Course," and provides an option for the inmate to choice one or more recipients, e.g., "Choose an Authorized Recipient(s) to Receive the Message: Jane Doe; Jim Doe." Based on this feature, the app enables messaging.

Example Music Features

In certain implementations of the invention, inmates are rewarded with privileges for desirable effort and success. For example, an inmate may earn the privilege of listening to music during one or more subsequent courses or generally based on effort/success on a first course. Inmates who enjoy listening to music while working on courses are motivated to successfully take a test after a course or to complete a course-related milestone. Music enabling rewards and other privilege-based rewards could be infrequent and, the infrequency of such rewards, could provide a significant motivator for many inmates.

Figure 7:
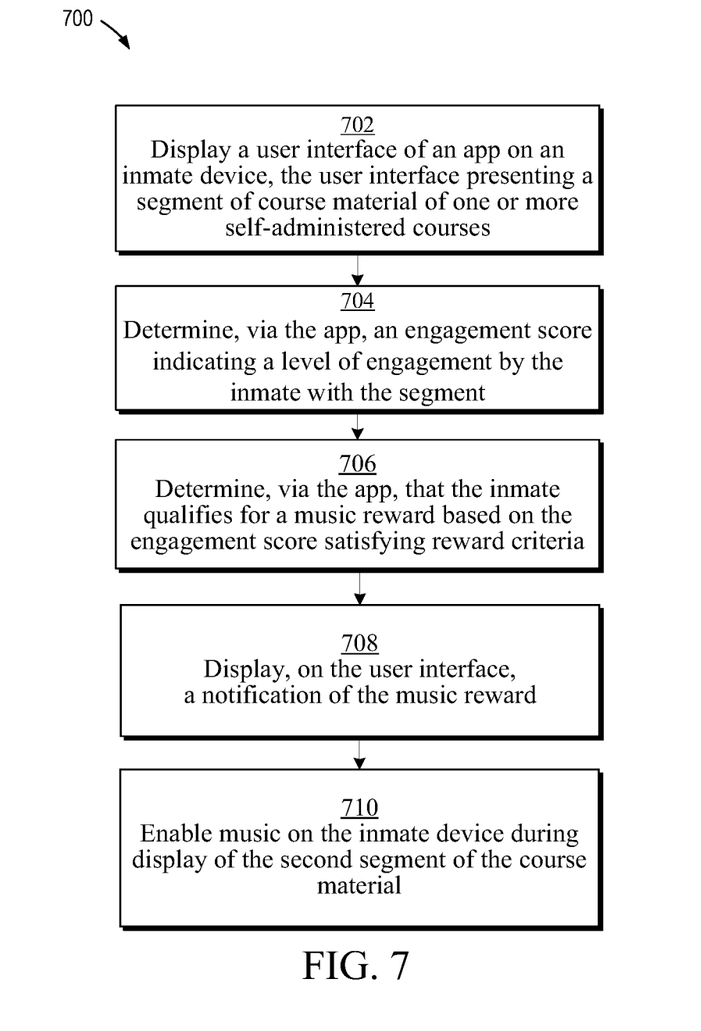
FIG. 7 is a flow chart illustrating an exemplary method for providing user interfaces with music enabling capability to motivate engagement by inmates of confinement institutions with self-administered courses.

FIG. 7 is a flow chart illustrating an exemplary method for providing user interfaces with music enabling capability to motivate engagement by inmates of confinement institutions with self-administered courses. The exemplary method 700 is described in the context of implementation via one or more modules, such as by courses module 1010, evaluation module 1012, and reward module 1014 of FIG. 10, although other devices and configurations can also be used to implement the method 700. The exemplary method 700 can be implemented by storing and executing instructions in a non-transitory computer-readable medium. Reference to the method 700 being performed by a computing device includes the method 700 being performed by one or more computing devices.

The method 700 involves displaying a user interface of an app on an inmate device, as shown in block 702. The user interface presents a segment of course material of one or more self-administered courses. The method 700 involves determining, via the app, an engagement score indicating a level of engagement by the inmate with the segment, as shown in block 704. In one implementation of the invention, the engagement score is determined based on input received from the inmate in response to questions about the course material. In one implementation of the invention, the engagement score is determined based on input received from the inmate in response to an input request requiring input within a predetermined time period. In one implementation of the invention, the engagement score is determined based on a sensor on the inmate device tracking an eye, face, or head of the inmate.

The method 700 further involves determining, via the app, that the inmate qualifies for a music reward based on the engagement score satisfying reward criteria, as shown in block 706. The reward criteria can require particular engagement scores, e.g., based on a particular number or percentage of correct answers, particular course participation scores, particular course content/learning scores, course completions, combinations of course completions, achievements with respect to an inmate specific plan, etc. In one example, the reward criteria require particular participation response scores or statistics (e.g., requiring that the inmate responded to at least 80% of requests for participation responses during the course), and/or other factors. The reward criteria can vary according to a random factor. For example, in some instances the reward criteria can require 80% correct answers and in other instances the reward criteria can require 90% correct answers.

The method 700 can involve automatically identifying the music reward or identifying the music reward based on inmate input on the user interface. For example, this can involve receiving input from the inmate selecting the music reward from a plurality of rewards made available to the inmate based on the engagement score.

The method 700 further involves displaying, on the user interface, a notification of the music reward, as shown in block 708. In one implementation, the music reward involves an inmate selection via a user interface control of one or more specific songs. For example, this can involve the system identifying a plurality of songs, displaying icons representing the plurality of songs on the user interface, receiving a selection on the user interface of an icon representing a song of the plurality of songs, and, based on receiving the selection of the icon, adding the song to a library of songs available to the inmate. The music enabled on the inmate device during display of later segments of course material or generally includes the library of songs.

The method 700 further involves enabling music on the inmate device during display of a second segment of the course material, as shown in block 710. In one implementation of the invention enabling the music on the inmate device involves enabling streaming of the music from a remote music service. In one implementation of the invention, it involves enabling a music player application on the inmate device. In one embodiment of the invention, a course app, reward app, or combined course/reward app disables music use by enabling exclusive use of sound resources. Exclusive use of sound resources can be achieved, for example, by accessing an operating system attribute or using a resource (e.g., a video player) that automatically implements exclusive audio. In this way, a separate music app cannot be used while the course app, reward app, or combined course/reward app is active, e.g., while the inmate is accessing course materials and/or reward functions using the app. Conversely, to enable music on the device, the course app, reward app, or combined course/reward app disables exclusive use of the sound resource by accessing the operating system attribute or discontinuing use of a resource.

In one implementation of the invention, control of music on the inmate device is controlled by controlling the music content, e.g., the music files. For example, the music files of the inmate can be stored in a local or remote file location and access to those music files, e.g., for playing via a music playing app on the device, is selectively controlled by the course app, reward app, or combined course/reward app. For example, when music is disabled those files can be locked or otherwise made inaccessible to the music app.

In another implementation of the invention, the course app, reward app, or combined course/reward app monitors background processes running on the device and discontinues music related processes when music is disabled on the device.

In other implementations, the criteria discussed with respect to method 700 may be used for implementing techniques that use other types of rewards in addition to or as an alternative to music-based rewards.

Example Messaging Features

In some implementations of the invention, achievements and credits earned by the inmate are used to provide encouraging messages to the inmate and/or to enable messaging features as rewards. For example, an inmate completing courses x, y, and z with an average engagement score above a threshold value may be sent a text message, e-mail, or other message that says "Fully Engaged Achievement," or the like. The message can additionally or alternatively provide information to the inmate. For example, the message may identify that only 10% of inmates achieved the award. In another example, the message identifies that 50% of inmates who achieved the award found employment upon release. Generally, information that is included in such messages can provide encouragement by including statistical information and results about other inmates based on the tracking of other inmates' progress and subsequent activities after release from confinement facilities. Thus, in such implementations of the invention, the system tracks inmate course progress, course engagement, and subsequent arrests, employments, drug addiction relapses, and other activities. Such tracking can be used to improve the courses themselves, the effectiveness of the encouragement program, and/or to provide messages to inmates to motivate their engagement with courses.

In other implementations of the invention, credits awarded to the inmate trigger notifications, messages to third parties, or awards given to third parties. For example, when an inmate achieves a threshold number of credits, a family member may be sent a message that identifies the inmate's achievement and suggests that the family member give the inmate a call or send a message to say congratulations to the inmate. A similar technique can be used to encourage counselors, staff, and others to provide human encouragement to the inmate to continue his or her engagement and efforts. In another example, when an inmate achieves a threshold number of credits, a family member is awarded a free call or message to the inmate and encouraged to use the free call or message to congratulate the inmate, e.g., with a message that says "Call John now to congratulate him on achieving 100% engagement scores on course x, course y, and course z." When the inmate earns a certificate, with prior permission, a copy of the certificate can be emailed to a family member, employer or case worker along with a coupon for a free call or message to contact the inmate with a congratulatory message.

Figure 8:
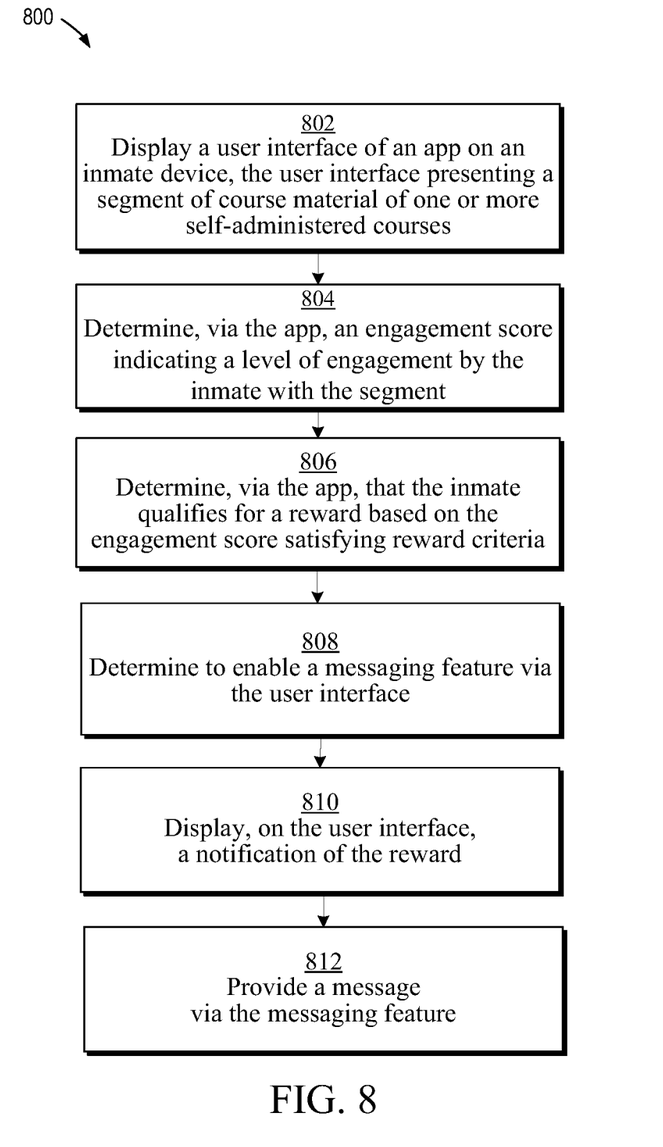
FIG. 8 is a flow chart illustrating an exemplary method for providing user interfaces with messaging features to motivate engagement by inmates of confinement institutions with self-administered courses.

FIG. 8 is a flow chart illustrating an exemplary method 800 for providing user interfaces with messaging features to motivate engagement by inmates of confinement institutions with self-administered courses. The exemplary method 800 is described in the context of implementation via one or more modules, such as by courses module 1010, evaluation module 1012, and reward module 1014 of FIG. 10, although other devices and configurations can also be used to implement the method 800. The exemplary method 800 can be implemented by storing and executing instructions in a non-transitory computer-readable medium. Reference to the method 800 being performed by a computing device includes the method 800 being performed by one or more computing devices.

The method 800 involves displaying a user interface of an app on an inmate device, as shown in block 802. The user interface presents a segment of course material of one or more self-administered courses. The method 800 involves determining, via the app, an engagement score indicating a level of engagement by the inmate with the segment, as shown in block 804. The engagement score can be determined via one or more of the techniques disclosed herein.

The method 800 further involves determining, via the app, that the inmate qualifies for a reward based on the engagement score satisfying reward criteria, as shown in block 806. The reward criteria can require particular engagement scores, e.g., particular test scores response statistics (e.g., responded to at least 80% of requests for responses during the course), and/or other factors. The reward criteria can be specific for a single reward, applicable to a group of rewards, or applicable to all available awards. Thus, an inmate can earn one or more rewards for achieving a given engagement score. In another example, the inmate earns one reward (or another specified number of rewards) that the inmate can select from multiple reward options. Rewards can also be earned in greater number based on the inmate's engagement score. For example, earning above a particular engagement score threshold (e.g., 80%) may earn a first level reward (e.g., messaging the inmate's counselor), earning above a second engagement score threshold (e.g., 90%) may earn the first level reward and a second level reward (e.g., messaging the inmate's family and friends), etc.

The method 800 further involves determining to enable a messaging feature via the user interface, as shown in block 808. In one implementation, the messaging feature is enabled based on an automatic selection of a messaging reward. In another implementation, the messaging feature is enabled based on an inmate selecting an option on the user interface to select a messaging reward.

The method 800 further involves displaying, on the user interface, a notification of the reward. For example, the user interface can display a screen such as user interface screen 600 of FIG. 6.

In block 812, the method 800 provides a message via the messaging service. In one embodiment of the invention, a course app, reward app, or combined course/reward app enables messaging by providing a credit that the inmate can use to send and/or receive one or more messages. In one example, the messaging system is configured to normally charge for the sending of messages and the credit enables the inmate to send or receive one or more messages for free or at a reduced rate.

In one implementation of the invention, messaging is enabled by popping up a special-purpose window that enables the sending of a message. Such a popup window can be separate and distinct from the usual interface used for messaging in other contexts. Additionally, or alternatively, the recipients, content, size, and/or other attributes of a message can be limited in such a popup window. In one example, the popup window offering the message is only available for a period of time, e.g., the inmate can send a free message about completing a course but must do so using the window within 1 minute of the window appearing or the window disappears. Such measures can reduce the chance of abuse of the system.

Example Content/Benefit Rewards

In another implementation of the invention, credits awarded to an inmate are used to provide a content-based reward to the inmate. For example, the credits can be used by the inmate to purchase movies, songs, audiobooks, and/or other electronic content. Such content can be donated by or purchased from the content producers using public or donated funds. In another example, the credits earned by the inmate are used to purchase telephone call time or messages. Such call time or messages can also be purchased to be provided as rewards to inmates using public or donated funds.

In yet another implementation of the invention, credits awarded to an inmate are used to provide a scholarship to the inmate for past or future courses. In one example, an inmate enrolls in a GED prep-program that includes a series of courses that collectively allow the inmate to prepare to take GED courses or the GED exam upon release from the institution. In this example, the inmate may be able to pay for some or all of the courses using credits awarded based on the inmate's engagement. The costs of the courses or exam that are paid for by the inmate can be subsidized using public or donated funds. The credits earned by an inmate can be used to pay for the cost of a proctor that oversees course participation and/or testing. In another example, the credits earn the inmate enrollment in a classroom course that the inmate can attend while on leave or after release from the institution.

Example Techniques for Creating a Course Plan

In some implementation of the invention, a user interface is configured to selectively use and present capabilities that are specific to inmates (e.g., based on an assessment of the inmate or the inmate's interests) as rewards to motivate course engagement.

Figure 9:
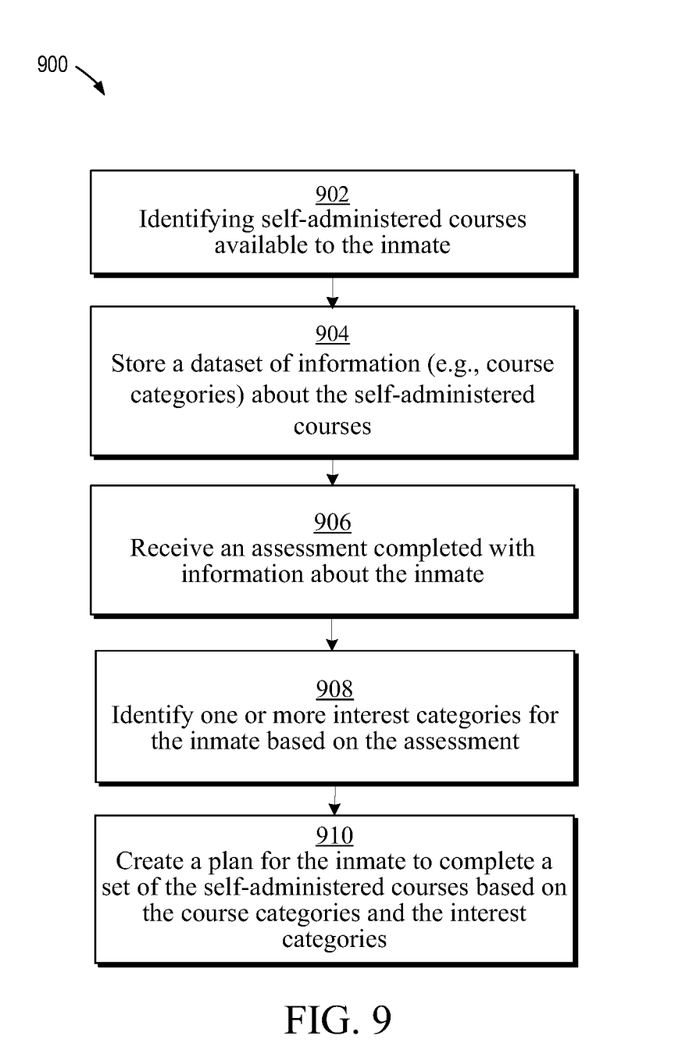
FIG. 9 is a flow chart illustrating an exemplary method for creating a plan for an inmate to complete self-administered courses based on an assessment of the inmate.

FIG. 9 is a flow chart illustrating an exemplary method 900 for creating a plan for an inmate to complete self-administered courses based on an assessment of the inmate. The exemplary method 900 is described in the context of implementation via one or more modules, such as by courses module 1010, evaluation module 1012, and reward module 1014 of FIG. 10, although other devices and configurations can also be used to implement the method 900. The exemplary method 900 can be implemented by storing and executing instructions in a non-transitory computer-readable medium. Reference to the method 900 being performed by a computing device includes the method 900 being performed by one or more computing devices.

The method 900 involves identifying self-administered courses available to the inmate, as shown in block 902, and storing a dataset of information about the self-administered courses, as shown in block 904. Storing the dataset of information can involve storing course categories of the self-administered courses. The method 900 involves receiving an assessment completed with information about the inmate, as shown in block 906. The information about the inmate is used to identify one or more interest categories for the inmate, as shown in block 908. The method 900 creates a plan for the inmate to complete a set of the self-administered courses based on the course categories and the one or more interest categories identified for the inmate, as shown in block 910. The inmate then uses the user interface (or another app or device) to view the courses, earn rewards, and otherwise achieve success. The rewards available to the inmate may be selected based on the inmate's interests identified based on the assessment.

Example Techniques for Providing Engagement Scores/Credits

Engagement scores and/or credits can be awarded based on how well an inmate answers questions about the course material, e.g., based on how often the inmate answers correctly, the percentage of correct answers, etc. For example, when an inmate takes a test during or at the conclusion of a course, a score or credits for the inmate can be determined based on the number of questions answered correctly. As a specific example, if the inmate correctly answers 4 out of 4 questions, the inmate can receive 125% of the designated credits (e.g., receiving 125 credits based on 100 credits designated for the course). If the inmate correctly answers 3 out of 4 questions, the inmate receives 75% of the credits (e.g., receiving 75 credits based on 100 credits designated for the course). If the inmate correctly answers 2 out of 4 questions, the inmate receives 50% of the credits (e.g., receiving 50 credits based on 100 credits designated for the course). If the inmate correctly answers 1 or 0 out of 4 questions, the inmate receives 0% of the credits (e.g., receiving no credits). This non-linear technique for awarding credits can encourage high levels of engagement with the course content.

Implementations of the invention automatically or manually create test questions for courses that can be used to measure inmate engagement in the course. The system may facilitate use of courses that are provided by third parties (i.e., different from the system provider and/or institution) and can create specific questions for the purpose of measuring engagement with the courses. Such questions can be in addition to and/or different from the questions that are included in a course. This is useful, for example, in circumstances in which the system does not have access to the results of each course's included (self-contained) evaluations. In one example, a subset of a course's self-contained questions are automatically selected (e.g., by selecting every third question, random questions, or questions with particular keywords) or manually selected (e.g., by reviewers). In one example, reviewers pull selected questions for a course and create a mini test that is provided at the end of the course to measure the inmates' engagement with the course. Various techniques can be used to motivate the inmates to complete these engagement tests. In one example, courses are offered and, upon completion of the course, an inmate is sent a test with an offer to earn bonus credits for taking the test.

The number of credits awarded can also be determined based on other factors, such as the number of times an inmate attempts a given question. For example, if the inmate correctly answers the question the first time, the score is higher than if it takes the inmate several attempts to correctly answer the question. In such an example, the inmate can retake a course evaluation/test after repeating some or all of the course. However, the number of credits available decreases. This provides an incentive for the inmate to pay close attention. If the inmate would like to review parts of the course, the inmate can highlight/identify an area of interest, and repeat the desired portion of the course until the inmate understands the content and/or successfully completes the associated portion of the course evaluation/test.

The user interface of the system also provides the capability for the inmate to identify, bookmark, flag and/or store parts of the content of a course for further study. An inmate can bookmark only the sections he or she wishes to save for later reference and thus, via the system, have the most relevant course portions available for later reference.

The system can additionally or alternatively allow an inmate to create keywords for a particular course or portion of a course. For example, an inmate may tag a particular video of the three videos in a particular course with a "finance" tag. The inmate can later search for content using that tag and navigate more easily to the particular video. In another example, the inmate may tag content (e.g., a quote referenced in course materials) with a person's name to whom the inmate wishes to share the quote. In one example, the inmate identifies a quote from a novel/book/poem referenced in course material and sends that quote in an email/message to a friend or family member.

In order to effectively use limited resources, agencies may wish to track an inmate's performance while incarcerated to identify inmates that could qualify for agency benefits. Such agencies are often interested in identifying the inmates that are serious about making positive changes so that the agency's limited resources can be focused on those inmates and produce the best results. For example, agencies that provide re-entry services may wish to selectively provide those services to inmates based on the abilities and/or effort of the inmates. If an agency has 10 rooms for discounted rent available and there are 20 inmates being released in the next month in the geographic area, the agency may desire to select 10 of those 20 inmates based on demonstrations of ability and/or effort from the inmates. The credit-based inmate motivation systems and techniques herein award credits to inmates based on ability and effort and thus provide a valuable measure of the criteria that agencies may be looking for in distributing their limited resources. Thus, in an implementation of the invention, credits awarded to the inmate are used to selectively provide discounted or free reentry services to the inmate. In one example, the system may present a list of limited resources (e.g., 10 discounted rental units, 10 meal vouchers, etc.) that are available to the first inmates to redeem credits for those resources. In such a system, the inmates are motivated to earn sufficient credits and redeem them quickly for the resources before the resources are redeemed by other inmates. Alternatively, credits can simply be used to qualify inmates for particular resources, e.g., so that certain resources are only available to inmates who earn enough credits. Thus, for example, when an inmate achieves a threshold number of credits, the inmate may qualify for discounted food, discounted child care, or a discounted stay at a housing facility focused on providing housing for newly release inmates. In this example, the credits are not necessarily "redeemed" for individual resources but rather used as a measure to gauge whether an inmate is eligible for the resources.

The awards available to the inmate are preferably used according to the inmate's preferences. For example, to protect an inmate's privacy, the inmate may have to consent to, or otherwise set a preference for, allowing messages to third parties. In one example, the inmate is able to identify particular individuals, phone numbers, or e-mail accounts that will receive messages or otherwise have access to the inmate's engagement scores, credits, and other results. In one implementation of the invention, the system provides a user interface that allows the inmate to send or publish results to particular individuals or companies. For example, the inmate may identify three potential employers and send engagement credits and other results to those employers. Such information can provide information about the inmate relative to other inmates, e.g., identifying that the inmate completed a course and achieved a 100% engagement score and all available points, noting that only 4.3% of inmates achieve similar results and that the recidivism rate of other inmates who achieved similar results in the past was less than 2%.

Implementations of the invention additionally, or alternatively, motivate inmates to provide feedback regarding courses using incentives. Such feedback can be used to determine course ratings, course recommendations, and to otherwise help inmates identify and use the best courses for their particular needs, risks, and circumstances. In one example, an inmate is asked to rate or provide other feedback on a course immediately following the inmate's completion of the course. The inmate can receive a reward (such as one or more of the rewards noted above) based on completing the rating/feedback and/or also demonstrating engagement with the course. The feedback can include features designed to detect ill-considered feedback responses. For example, an inmate could simply select option A of options A, B, C, and D for all of the feedback questions in a feedback survey without thinking about the questions and response options. To detect such occurrences, the system automatically formulates feedback questions that are duplicative/similar to one another but with answers in different orders. The system then evaluates survey question responses to identify incongruence (e.g., the inmate indicated that the course was too long in one response and too short in another response). The system then holds back incentives for inmates who provide incongruent feedback until acceptable feedback is received.

Implementations of the invention additionally, or alternatively, motivate feedback from inmates in the days, weeks, months or even years after the completion of the course by the inmate. For example, if an inmate takes a course on computer programming, the inmate may receive an incentive for providing feedback upon completion of the course and/or an incentive for providing feedback 6 months after the course. This latter feedback is useful in determining the long term value of the course. In this example, if the inmate has been released, such feedback may identify whether the computer programming lessons of the course were helpful in obtaining a job and/or performing the actual duties of the job.

The incentives provided to former inmates (i.e., after release from the institution and reentry into society) can include continued access to content and resources that were used while incarcerated and/or access to new content and resources that are made available after release. The inmate may have a "briefcase" of content and resources collected and organized while within an institution and desire to continue using those materials and the "briefcase" organization after release.

Implementations of the invention provide inmates with the ability to search for courses and other resources, receive certificates for engaging with and providing feedback on those courses, distribute those certificates to family members, lawyers, employers, and other parties, receive incentives including discounted content, discounted phone calls, certificate distribution, inspiration (e.g., scripture quotes, discounted counseling, peer counselling, etc.), and utilize the feedback of others in selecting courses and resources to use.

The techniques discussed herein are provided by a computing system that includes one or more computing devices. For example, inmates may use tablets, laptops, cell phone, or mobile devices to participate in the courses. Such personal computing devices can be configured to track user interactions (e.g., keystrokes, mouse movements, touches, eye movements, head movements, body movements) and/or to identify the inmate (e.g., using facial recognition, fingerprints scans, retina scans, etc.). Such devices, in one implementation of the invention, are configured with a web browser or media player that receives and provides a user interface of an online course. Content for the online course can be downloaded, streamed, or otherwise received from a remote source. The web browser or media player implements a UI that tracks users for the purpose of assessing user engagement. Information about the user's engagement (e.g., responses to questions, eye gaze information, information about use of other applications, etc.) is sent from the personal devices to one or more tracking servers that compile and store information about the user's engagement. These or other server devices provide user interfaces that allow the user inmates to view and use earned engagement credits, messages, and rewards.

The personal and server devices include processors and instructions executed by the processors to provide the techniques discussed herein. Various system and network configurations can be used.

Exemplary System

Figure 10:
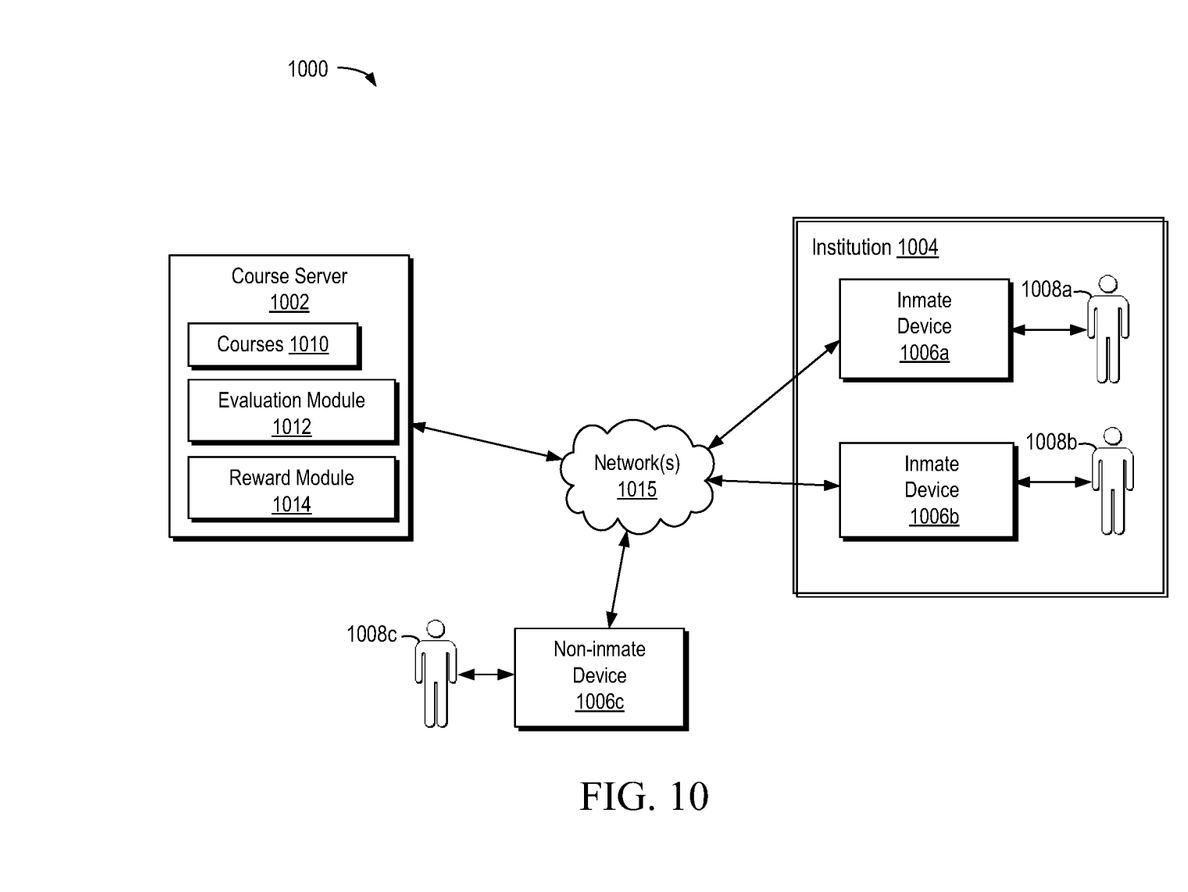
FIG. 10 is block diagram of a computing environment in which one or more implementations of the invention can be practiced.

FIG. 10 is a diagram of an environment in which one or more implementations of the present disclosure can be practiced. The system configuration of FIG. 10 is provided as one example of a system 1000 configuration. In a particular implementation, devices and the communications between them as well as the allocation of functionality amongst the multiple devices involved can be configured differently depending upon the particular circumstances of the implementation.

In FIG. 10, there is a course server 1002 and, within an institution 1004, inmate devices 1006a, 1006b used by inmates 1008a, 1008b. The system 1000 also includes a non-inmate device 1006 used by non-inmate 1008c. These devices 1002 and 1006a-c are configured to communicate with one another via network 1015. For example, inmate devices 1006a-b and non-inmate device 1006c can be configured with apps (e.g., a web browser or a specialized app) for communicating with one another and with course server 1002. The apps can additionally or alternatively include calling/messaging functionality enabling the inmates to place calls, receive calls, send messages, receive messages, and for other purposes related to communications with and information about the inmates, non-inmates, and the institution 1004. The apps can include software modules that facilitate the monitoring of calls, messages, music, content, and/or the information that is accessed via and/or stored on the inmate devices 1006a-b and non-inmate device 1006c. The apps can include software modules that monitor the devices to ensure that inmates are not able to use the devices and/or communications for prohibited purposes.

The server 1002 includes courses 1010, an evaluation module 1012, and a reward module 1014. The courses include functionality and/or content such as, but not limited to, files having images, videos, text, audio, slides, presentations, other types of electronic content and/or combinations of types of electronic content. Courses 1010 are accessed for viewing/use on the inmate devices 1006a-b and non-inmate device 1006c. The functionality of the courses can include user interface features specific to particular courses, functions for determining related courses, and/or other functions useful in administering courses to inmate attendees. The functionality can additionally or alternatively enforce configurable parameters, e.g., time limits, engagement tracking, etc.

The evaluation module 1012 also includes functionality and content. The content includes examination questions (i.e., text, audio, etc.), question sequencing, etc. The functionality can include software that automatically generates/selects questions, answer choices, and/or correct answers. The functionality can additionally or alternatively enforce configurable parameters, e.g., time limits, engagement tracking, etc.

The reward module 1014 also includes a reward module for tracking engagement/credits, determining rewards, and/or enabling rewards that are provided on the inmate devices 1006a-b and/or non-inmate device 1006c.

Figure 11:
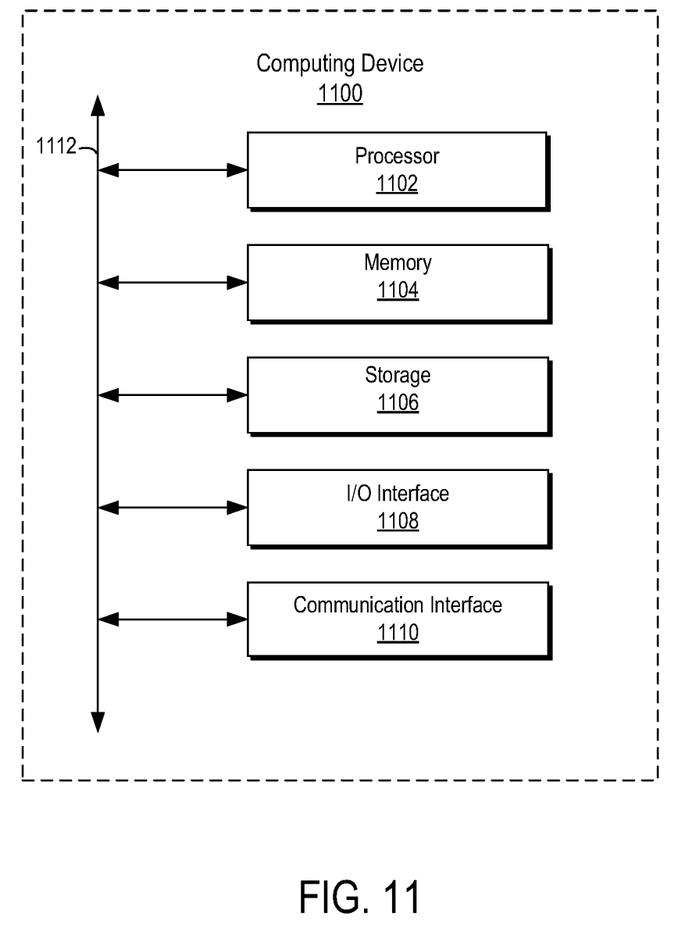
FIG. 11 is a block diagram depicting an example hardware implementation.

FIG. 11 is a block diagram depicting an example hardware implementation for the servers and devices described in FIG. 10. Each such device 1100 may include a processor 1102 that is communicatively coupled to memory 1104 and storage 1106 and that executes computer-executable program code and/or access information stored in the memory 1104 and storage 1106. The processor 1102 may comprise a microprocessor, an application-specific integrated circuit ("ASIC"), a state machine, or other processing device. The processor 1102 can include any of a number of processing devices, including one. Such a processor 1102 can include or may be in communication with a computer-readable medium storing instructions that, when executed by the process, cause the processor to perform the operations described herein.

The memory 1104 and storage 1106 can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, and ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++ C#, Visual Basic, Java, Python, Perl, and JavaScript.

The device 1100 may also comprise a number of external or internal devices such as input or output devices. For example, the device 1100 may have input/output ("I/O") interface 1108 that can receive input from input devices or provide output to output devices. A bus 1112 can also be included in the device 1100. The bus 1112 can communicatively couple one or more components of the server. The server can execute program code that configures the processor to perform one or more of the operations described above with respect to the Figures. The program code may be included in the memory or any suitable computer-readable medium and may be executed by the processor or any other suitable processor. In additional or alternative Implementations, program code can be resident in a memory that is accessible via a data network, such as a memory accessible to a cloud service.

The device 1100 can also include at least one network interface device or other communication interface 1110. The communication interface 1100 can include any device or group of devices suitable for establishing a wired or wireless data or telephone connection to one or more networks. Non-limiting examples of a network interface device include an Ethernet network adapter, a modem, and/or the like. A device can transmit messages as electronic or optical signals.

An electronic device can be a computer, telephone, mobile device, tablet, smart phone, smart watch, or any communications device. A communications device can include a processor, memory, a bus, input/output components, network interface components, and other appropriate communication components. Non-limiting examples of input devices include a touch screen (e.g., one or more cameras for imaging a touch area or pressure sensors for detecting pressure change caused by a touch), a mouse, a keyboard, or any other device that can be used to generate input events in response to physical actions by a user of a computing device, or a microphone. Non-limiting examples of output devices include an LCD screen, an external monitor, a speaker, or any other device that can be used to display or otherwise present outputs generated by a computing device. The device can execute program code that configures the processor to perform one or more of the operations described above.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not be described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more Implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

The foregoing description and summary of the invention are to be understood as being in every respect illustrative and exemplary, but not restrictive, and the scope of the invention disclosed herein is not to be determined only from the detailed description of illustrative Implementations but according to the full breadth permitted by patent laws. It is to be understood that the Implementations shown and described herein are only illustrative of the principles of the present invention and that various modification may be implemented by those skilled in the art without departing from the scope and spirit of the invention.

What is claimed is:

1. A method of providing user interfaces with messaging features to motivate engagement by inmates of confinement institutions with self-administered courses, the method comprising:
    displaying a user interface of an app on an inmate device, the user interface presenting a segment of course material of one or more self-administered courses;
    determining, via the app, an engagement score indicating a level of engagement by an inmate with the segment of the course material during the display of the segment of the course material;
    determining that the inmate achieved an achievement based on determining that the engagement score exceeds a threshold value; and
    based on determining that the inmate achieved the achievement:
        providing a message via a messaging feature to a person other than the inmate, the message identifying the achievement of the inmate and encouraging the person to contact to the inmate regarding the achievement
        generating statistical information about other inmates who achieved the achievement, the statistical information determined based on tracking inmate course progress for a plurality of other inmates and the statistical information identifying a percentage of the plurality of other inmates that achieved the achievement; and
        providing the statistical information to the inmate or the person other than the inmate.

2. The method of claim 1, further comprising:
    identifying recipients authorized to receive messages from the inmate;
    displaying a list of the recipients on the user interface;
    receiving input on the user interface selecting a recipient of the recipients; and
    sending the message to the recipient.

3. The method of claim 1, wherein providing the message comprises displaying, in the user interface, graphical or textual content praising the inmate.

4. The method of claim 1, wherein the message identifies a percentage of inmates who earned the reward and achieved a particular achievement after release from a confinement institution.

5. The method of claim 1, wherein the person other than the inmate is identified by:
    receiving a telephone number or e-mail address input by the inmate on the user interface;
    identifying a person associated with the telephone number or e-mail address; and
    determining that the inmate is allowed to communicate with the person based on an inclusion list or exclusion list.

6. The method of claim 1 further comprising, based on determining that the inmate achieved the achievement, providing a certificate of the achievement to the person.

7. The method of claim 1, wherein the statistical information identifies a percentage of a subset of the plurality of other inmates that achieved the achievement and also found employment after release from a confinement institution.

8. The method of claim 1, wherein the statistical information identifies a percentage of a subset of the plurality of other inmates that achieved the achievement and who have also no record of being arrested following release from a confinement institution.

9. The method of claim 1, wherein the statistical information identifies a percentage of a subset of the plurality of other inmates that achieved the achievement and who have also no record of a drug addiction relapse following release from a confinement institution.

10. A method of providing user interfaces with messaging features to motivate engagement by inmates of confinement institutions with self-administered courses, the method comprising:
    displaying a user interface of an app on an inmate device, the user interface presenting a segment of course material of one or more self-administered courses;

determining, via the app, an engagement score indicating a level of engagement by an inmate with the segment of the course material during the display of the segment of the course material;

determining that the inmate achieved an achievement based on determining that the engagement score exceeds a threshold value; and awarding credits to the inmate based on determining that the inmate achieved the achievement;

providing one or more user interface options for selecting a reward, wherein a first option of the one or more user interface options corresponds to a reward that sends a gift from the inmate to a person other than the inmate;

receiving input from the inmate selecting the first option and using the credits to purchase electronic content as the gift to the person other than the inmate; and providing a message via a messaging feature to a person other than the inmate, the message identifying the achievement of the inmate and encouraging the person to contact to the inmate regarding the achievement, wherein the message provides the person other than the inmate with access to the electronic content that was provided as the gift.

11. The method of claim 10, wherein the message comprises personalized text received from the inmate.

12. The method of claim 10, wherein the message encourages the person to contact the inmate regarding the achievement by enabling a telephone call or subsequent message between the person and the inmate for no charge.

* * * * *